United States Patent [19]

Weber

[11] 4,143,589
[45] Mar. 13, 1979

[54] COFFEE BREWING APPARATUS AND METHOD

[75] Inventor: Robert L. Weber, New Canaan, Conn.

[73] Assignee: Webston Incorporated, New Canaan, Conn.

[21] Appl. No.: 843,421

[22] Filed: Oct. 19, 1977

[51] Int. Cl.² ............................................. A47J 31/32
[52] U.S. Cl. ...................................... 99/282; 99/283; 99/302 R
[58] Field of Search ..................... 99/302 R, 316, 318, 99/280, 281, 282, 283, 290

[56] References Cited

U.S. PATENT DOCUMENTS

| | | | |
|---|---|---|---|
| 1,687,095 | 10/1928 | Jones | 99/302 R |
| 2,786,408 | 3/1957 | Herrera | 99/302 R |
| 2,893,306 | 7/1959 | Herrera | 99/302 R |
| 3,085,495 | 4/1963 | Rosander | 99/302 R |
| 3,286,618 | 11/1966 | Barrera | 99/302 R |
| 3,364,842 | 1/1968 | Valente | 99/302 R |
| 3,381,604 | 5/1968 | Bixby | 99/283 |
| 3,423,209 | 1/1969 | Weber | 99/302 R |
| 3,451,329 | 6/1969 | Herrera | 99/290 |
| 3,482,989 | 12/1969 | Austin | 99/302 |
| 3,518,933 | 7/1970 | Weber | 99/302 R |
| 3,568,589 | 3/1971 | Robau | 99/283 |
| 3,570,390 | 3/1971 | Jordan | 99/282 |
| 3,589,271 | 6/1971 | Tarrant | 99/280 |

*Primary Examiner*—Harvey C. Hornsby
*Attorney, Agent, or Firm*—Cooper, Dunham, Clark, Griffin & Moran

[57] ABSTRACT

This coffee brewing apparatus includes a reservoir for fresh water, a heating chamber which is filled from the reservoir, a metering chamber which is filled from and entirely surrounded by the heating chamber, and a brewing chamber which receives the coffee to be infused. Valves between the reservoir and the heating chamber are controlled by a timing mechanism. A heater in the heating chamber is controlled by a thermostat to hold the water therein at brewing temperature. An air compressor, which delivers air to the metering chamber to force the heated water therefrom into the brewing chamber, is also controlled by the timing mechanism.

16 Claims, 10 Drawing Figures

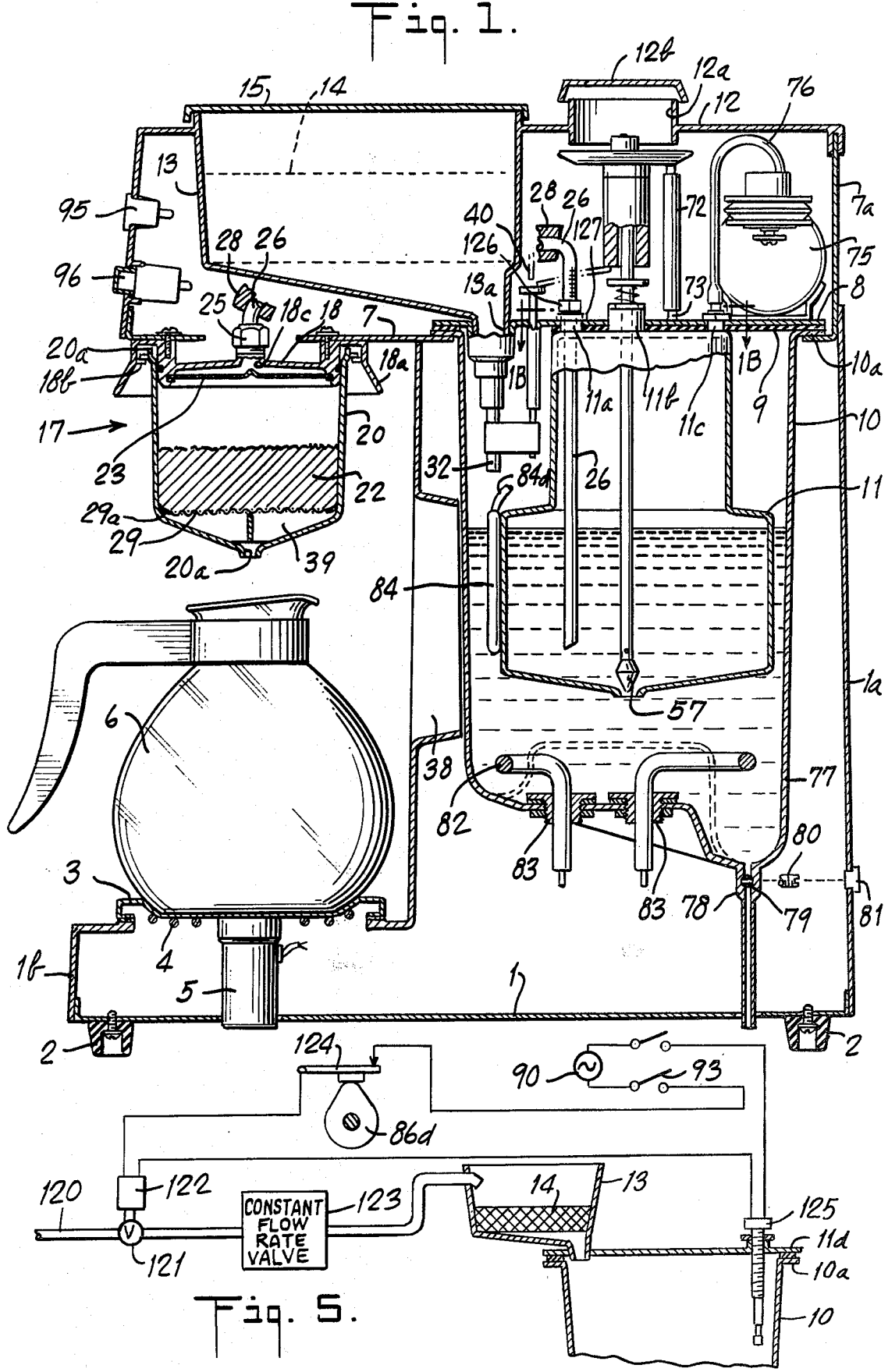

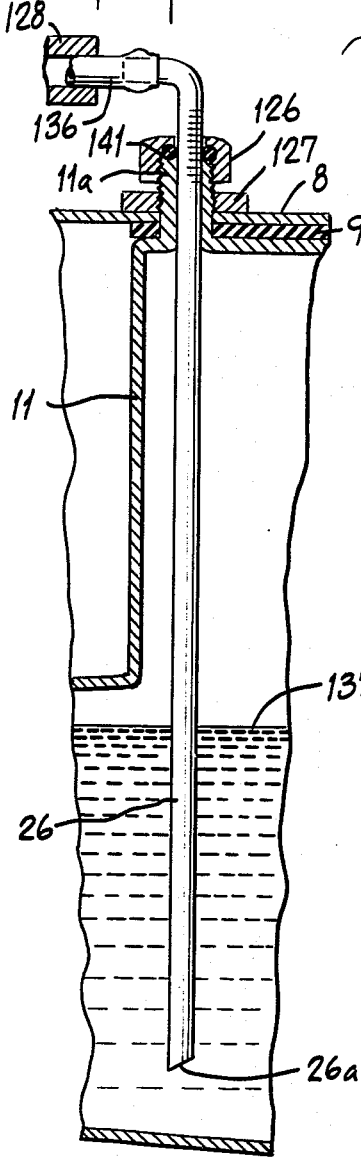
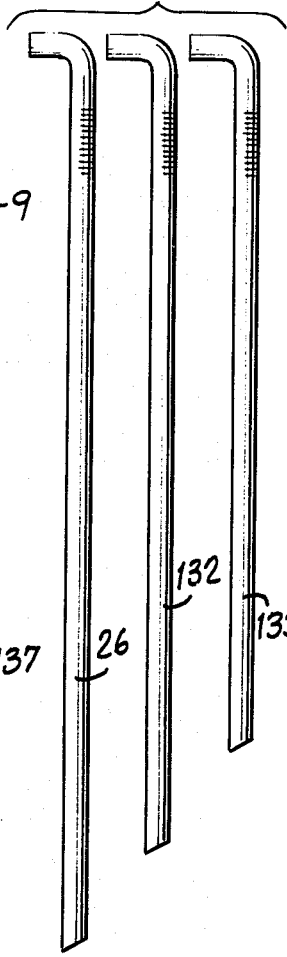
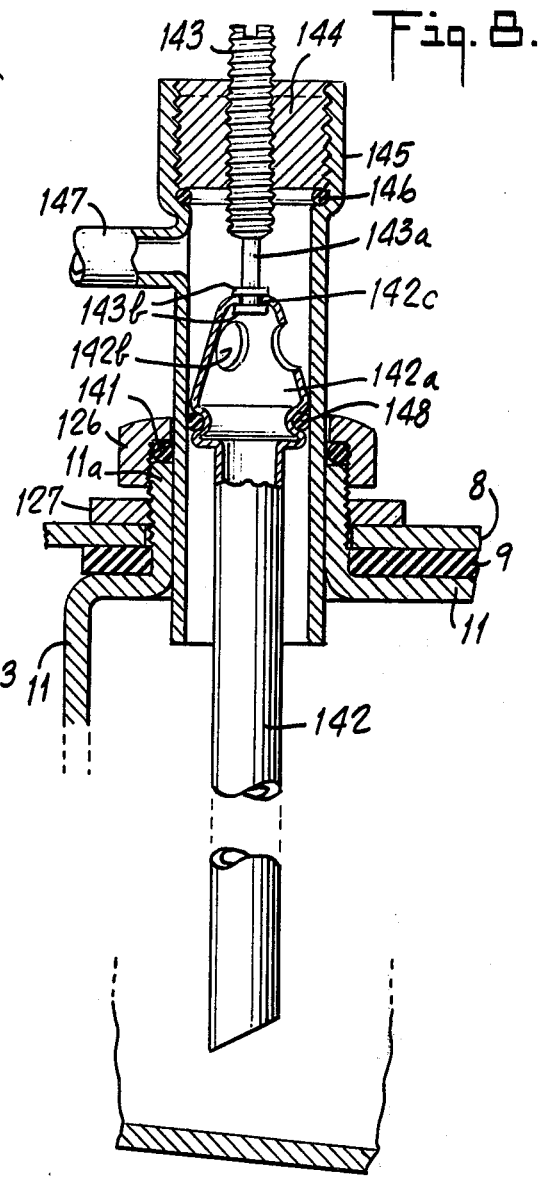
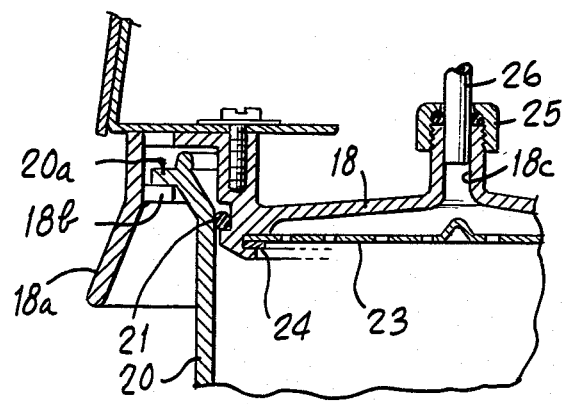
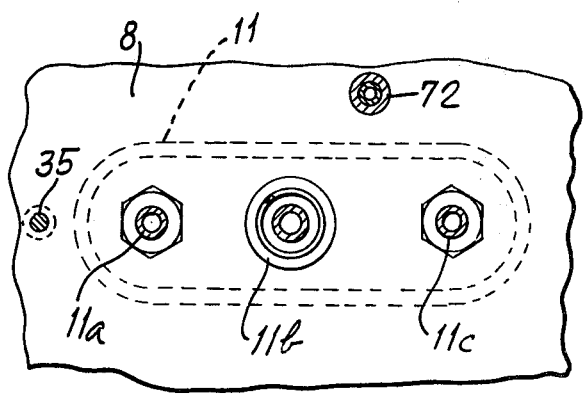

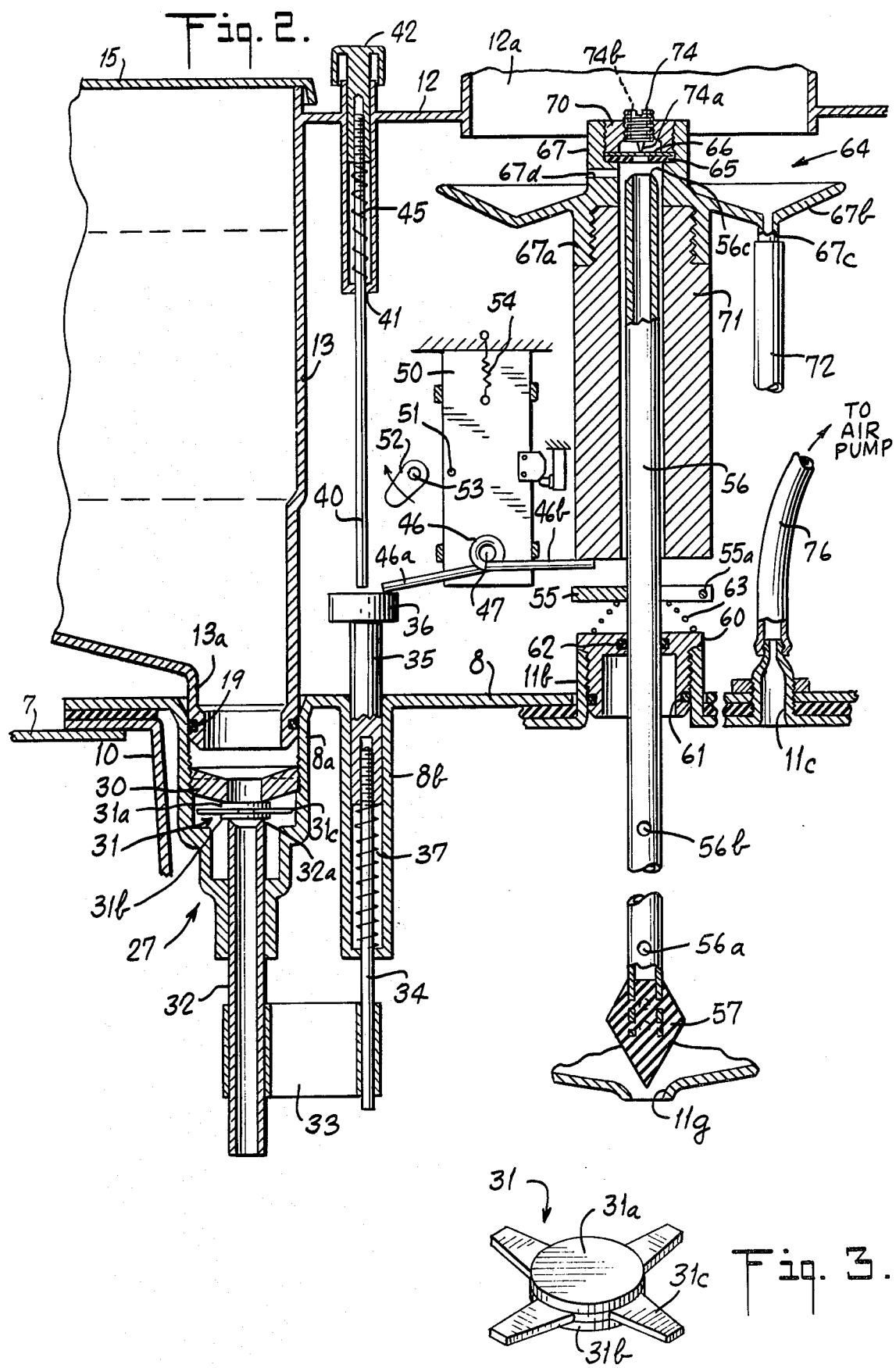

COFFEE BREWING APPARATUS AND METHOD

BRIEF SUMMARY OF THE INVENTION

Fresh water is supplied to a reservoir having a surface subject to atmospheric pressure. The reservoir may include a filter and may be filled either by hand or through a plumbing connection including a valve controlled in response to the level in either the reservoir or the heating chamber. The reservoir should be filled to a predetermined level. Water flows from the reservoir into a water heating chamber through a valve controlled by a timing mechanism. This valve may be manually opened to bypass the timing mechanism during initial fill up or other unusual conditions. The heating chamber is provided with a sight gage so that the level may be observed. When operating automatically, a predetermined level should be reached. If the water does not reach that predetermined level, then the manual bypass may be utilized to raise the water level. An electric heater is provided in the heating chamber and is controlled by the temperature of the water in that chamber.

Water flows from the heating chamber into a metering chamber which is entirely surrounded by the heating chamber. A valve controlling the flow between the heating chamber and the metering chamber is operated by a timing mechanism. The level in the metering chamber is determined by the pre-existing level in the heating chamber. After the metering chamber is filled, the valve is closed by the timing mechanism, and the metering chamber is emptied by applying air under pressure to the surface of the water therein. An outlet from the metering chamber has an open entrance end below the filled level in the metering chamber and extending above the top of the metering chamber to a brewing chamber which retains the coffee to be infused. The compressed air forces the water from the metering chamber through the outlet to the brewing chamber. The air pressure is maintained substantially constant. The volume of water delivered to the brewing chamber is determined by the difference between the filled water level and the outlet entrance level in the metering chamber. Thus, the apparatus supplies a fixed quantity of water to the brewing chamber at a substantially constant rate of flow. The air compressor is maintained in operation for a predetermined time after the water in the metering chamber has fallen below the level of the outlet conduit, so that the water in that outlet conduit and the water absorbed in the coffee are purged by a flow of compressed air so that substantially all of the water is forced out of the coffee.

DRAWINGS

FIG. 1 is a cross-sectional view of a coffee brewing apparatus embodying the invention, with some parts broken away.

FIG. 1A is a fragmentary view, showing a portion of the apparatus of FIG. 1, on an enlarged scale.

FIG. 1B is a fragmentary sectional view on the line 1B—1B of FIG. 1.

FIG. 2 is a fragmentary cross-sectional view of another part of the apparatus of FIG. 1, on an enlarged scale, illustrating some elements which are broken away in FIG. 1, and with other parts broken away to show details which do not appear in FIG. 1.

FIG. 3 is a perspective view of a valve element shown in FIG. 2.

FIG. 5 is a partly diagrammatic and partly elevational view showing a modified form of the invention adapted for a fixed plumbing installation.

FIG. 6 is a fragmentary view similar to a portion of FIG. 1, illustrating a modification.

FIG. 7 shows a set of three conduits usable in the modification of FIG. 6.

FIG. 8 shows another modification.

DETAILED DESCRIPTION

FIGS. 1–3

Figure 4:
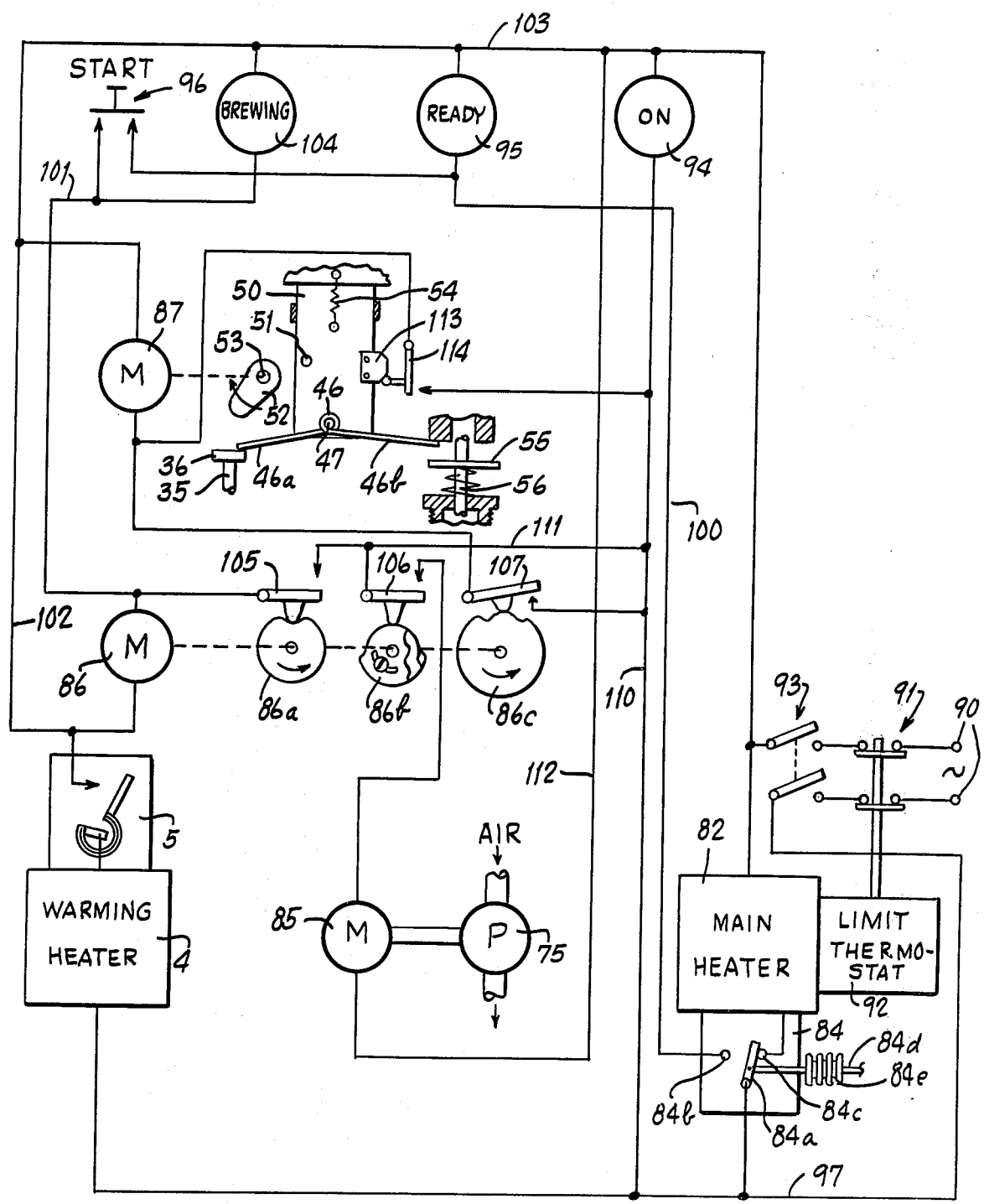
FIG. 4 is a wiring diagram of a timing control circuit for the apparatus of FIG. 1.

The apparatus is mounted in a casing 1 supported on feet 2. The casing 1 includes an upright portion 1a, appearing at the right in FIG. 1, and a lower horizontally extending portion 1b, which is open at its top and supports a warming plate 3. Under the plate 3 is provided a warming heater coil 4 controlled by a thermostat 5. A suitable coffee container 6 is shown resting on the plate 3. A top plate 7 is mounted on the upper end of the upright portion 1a of casing 1 and projects therefrom (to the left in the drawing), extending over the plate 3.

A heating chamber 10 is provided with an outwardly extending peripheral flange 10a at its upper end, which flange rests on the top plate 7 so that the heating chamber projects downwardly within the upright portion 1a of the casing. A metering chamber 11 is located entirely within and surrounded by the heating chamber 10. Both the chambers 10 and 11 may be blow molded of a suitable plastic, e.g., polysulfone. The metering chamber 11 has three tubular projections 11a, 11b and 11c in its upper surface. Those projections extend through a plate 8 whose periphery extends over the flange 10a, and which closes the top of heating chamber 10. A gasket 9 is between the plate 8 and the top of chamber 11. The projections 11a and 11c are externally threaded to receive nuts 127 which hold the chamber 11, the gasket 9, and the plate 8 assembled. Hence, the heating chamber 10, the metering chamber 11 and plate 8 are supported by the top plate 7.

The right-hand end of the top plate 7 extends upwardly as shown at 7a in FIG. 1. A cover 12 rests on the top plate 7. A reservoir 13 depends from the cover 12 and includes a water filter 14 which may be of conventional construction. A lid 15 covers the reservoir 13. The reservoir 13 has a bottom which slants downwardly to an outlet pipe 13a at its lowest point. The outlet pipe 13a projects downwardly into a recess 8a in the plate 8 (See FIG. 2). An O-ring 19, or other suitable seal, is provided between pipe 13a and recess 8a.

Depending from the extending portion of the top plate 7 is a brewing chamber generally indicated at 17. The brewing chamber consists of a head member 18 attached by screws to the plate 7 and having a downwardly extending peripheral flange 18a. A coffee container 20 is provided at its upper end with an outwardly flaring flange 20a. (See FIG. 1a). An O-ring 21 is trapped between the inner surface of the container 20 and a channel in the outer surface of the head member 18 to provide a seal. The flange 20a is provided in its outer periphery with a plurality of projections which may enter between corresponding projections 18b on the flange 18a. Thereafter the container 20 may be rotated through a short arc to seal the container 20 and the head 18 together.

The container 20 has a central outlet opening 20a in its conical bottom. A molded plastic bridge 39 rests on the bottom and supports a screen 29 on which the coffee 22 is placed. If desired, a filter paper or other suitable container for the coffee 22 may be used. The screen 29 has a flexible plastic peripheral lip 29a which sealingly engages the inside of the container 20.

A spreader 23 is fastened against the head 18 by a split ring clip 24. The head 18 is provided with a central inlet opening 18c attached by a suitable union 25 to a conduit 26, having a heat insulating sheath 28.

The recess 8a in the plate 8 is open at its lower end and encloses a valve mechanism shown in FIG. 2 and generally indicated at 27. The valve mechanism 27 includes an upper seat 30, which is threaded into an internally threaded portion of the recess 11e and abuts against a shoulder at the bottom of that threaded portion. The seat 30 is in the form of an inverted, truncated cone, with a central, sharp-edged aperture. A floating valve member 31, shown in perspective in FIG. 3, includes an upper valve disc 31a, a lower valve disc 31b and an intermediate stainless steel plate 31c with four projecting fingers, which is bonded to the valve discs 31a and 31b. A stainless steel tube 32 is slidable within the open lower end of the recess 8a and has its upper end formed with a knife edge, as shown at 32a, which cooperates with the lower valve disc 31b. The upper valve disc 31a cooperates with a knife edge on the lower surface of the seat member 30. The lower end of the tube 32 is attached as by welding or brazing to an arm 33 which extends horizontally and is similarly attached at its other end to a vertically extending rod 34 which projects into another recess 8b formed in the plate 8. The upper end of the rod 34 is threaded into a rod 35 of larger diameter which projects above the plate 8 and is provided at its upper end with a head 36. The head 36 limits the downward travel of the rods 35 and 34 and hence of the valve tube 32. The threaded connection between the rods 34 and 35 permits adjustment of the total travel. A coil spring 37 is captured between the lower end of rod 35 and the lower end of the recess 8b, and biases the rods 34, 35, the tube 32 and valve member 31 upwardly to the closed position shown in FIG. 2.

A manual push rod 40 is aligned vertically with the head 36, and slides vertically in a fixed guide sleeve 41 attached to the cover 12. Rod 40 has a head 42 threaded on its upper end. Head 42 projects upwardly above the top of the cover 12, so that rod 40 may be pushed down by hand. A coil spring 45 is retained between the head 42 and a shoulder at the lower end of the fixed guide sleeve 41 and biases the push rod 40 to its upper position. When the rod 40 is pushed downwardly, its lower end engages the head 36 of rod 35 and drives that rod downwardly a sufficient distance to move the valve 31 to its fully open position. In that position, water flows from reservoir 13 outwardly between seat 30 and valve disc 31a, then downwardly between the fingers 31c, and then inwardly between disc 31b and the knife edge 32a on the upper end of valve tube 32, and thence through that tube into the heating chamber 10.

The head 36 may alternatively be engaged for opening of the valve 31 by one end 46a of a coil spring 46 which is mounted on a post 47 carried by a vertically slidable plate 50. The plate 50 carries a pin 51 which may be engaged by a cam finger 52 fixed on a shaft 53 for the purpose of driving the plate 50 downwardly from the position shown in FIG. 2, against the force of a biasing spring shown diagrammatically at 54. This operation is described more completely below in connection with FIG. 4.

Heating chamber 10 is preferably made of transparent plastic, and the water level within it may be viewed through a slot 38 in the front of the housing 1.

The spring 46 has a finger 46b on its opposite end which, in the position shown, engages the lower end of a weight 71 and supports that weight. When the plate 50 is moved downwardly, the finger 46b engages a collar 55 fixed on a hollow steel tube 56 serving as a valve stem and carrying at its lower end a valve 57 which cooperates with an inlet opening 11g formed in the bottom of the metering chamber 11. The valve 57 controls the flow of water from the heating chamber 10 into the metering chamber 11. The valve 57 is molded of high temperature resistant silicone rubber. The stem 56 is provided with holes adjacent its lower end which facilitate adhesion of the silicone rubber to the steel tube.

The stem 56 extends through the projection 11b of the metering chamber 11. The opening in the tubular projection 11b is closed by a bushing 60 having an O-ring seal 61 between its outer periphery and the projection 11b and another O-ring seal 62 between its inner periphery and the valve stem 56. A coil spring 63 is retained between the bushing 60 and the collar 55, and biases the valve 57 and stem 56 upwardly to the position shown in the drawing. The collar 55 may be a split ring locked on the stem 56 by a screw 55a. The stem 56 is hollow and its provided with a lateral opening 56a near its lower end and at least one more opening 56b so as to provide fluid communication between the interior of the hollow stem 56 and the interior of the metering chamber 11. The lowest opening 56a serves as a drainage opening to empty the stem 56 when the apparatus is being taken out of service.

The upper end of the tube 56 is tapered to a knife edge, as shown at 56c. A pressure regulating mechanism generally shown at 64, when in its regulating position (not shown), rests on the knife edge 56c. A valve seat 65 of rubber or other suitable yieldable material is backed by a stainless steel disc 66. The seat 65 and the disc 66 are captured between a coupling member 67 and a bushing 70, which is threaded into a recess in the upper end of the coupling member 67. The coupling member has a downwardly depending extension 67a which threadedly engages the hollow cylindrical weight 71, encircling the stem 56. The coupling 67 is also provided with a peripheral flange 67b having a broad V-shaped valley contour. The flange 67b is provided at the bottom of the V with a drainage connection 67c connected by a flexible tube 72 and a connection 73 (FIG. 1) to the interior of the heating chamber 10. A plurality of lateral vents, one of which is shown at 67d, extend between the interior of coupling member 67 and its exterior at a locality just above the flange 67b.

A pressure adjusting plug 74 is threaded into the bushing 70 and has a conical tip 74a on its lower end, which is movable into a central aperture in the steel backup plate 66. The plug 74 is also provided with one or more vent passages 74b. The tip 74a and the plate 66 together define a regulatable outlet orifice for the air in the metering chamber 11. The plug 74 is provided with a screw slot in its upper end by which its position in the bushing 70 may be adjusted. By moving the plug 74 upwardly, the restriction between the metering chamber 11 and the atmosphere will be increased in size, thereby lowering the pressure maintained in the metering chamber 11. By moving the plug 74 downwardly, the restriction will be reduced in dimensions thereby increasing the pressure. The plug 74 is aligned with a vent 12a (FIG. 1) in the cover 12, which in turn is protected by an outer protective cover 12b (see FIG. 1). Vent 12a is in the form of a pipe protecting above and below the horizontal part of cover 12. The pipe serves to direct condensed water downwardly into the flange 67b.

Mounted on the plate 7 is an air compressor 75, having a discharge conduit 76 connected through a suitable coupling to the interior of the metering chamber 11.

The bottom of the heating chamber 10 is provided with a channel-shaped peripheral well 77. The bottom of the well 77 is slanted, as shown in FIG. 1. A drain 78 is provided at its lowest level. A valve 79 with a stem 80 having a screw slotted head is accessible to open the drain by means of a removable plug 81 in the casing 1a. A heater coil 82 is supported in the well 77 by its ends, which extend through bushings 83. The electric current to the heater coil 82 is regulated by a suitable thermostat, shown as including a bulb 84 (FIG. 1) mounted on the exterior surface of the metering chamber 11 so as to be directly aligned with the stream of fresh water issuing from the lower end of the valve tube 32. Bulb 84 is connected through a capillary tube 84d to a bellows 84e (FIG. 4) which operates a switch 84a.

The vertical position of the inlet end of the outlet conduit 26 leading from the metering chamber 11 to the brewing chamber 17 is adjustable for the purpose of changing the strength of the coffee. (See FIG. 6) The outside of the conduit 26 where it passes through the projection 11a carries a scale and is loosely encircled by a nut 126, which compresses an O-ring seal 141 against the end of projection 11a, By sliding conduit 26 within the nut 126, the vertical position of its inlet end may be adjusted. Tightening the nut 126 compresses the O-ring 141 against the conduit and holds the conduit in its adjusted position. By raising the lower end of the conduit 26, a smaller volume of water is supplied to the brewing chamber with each discharge cycle from the metering chamber 11. Thus, the coffee may be made stronger by raising the conduit 26 to decrease the volume of water, and it may be made weaker by lowering the conduit 26 to increase the volume of water.

The conduit 26 may be provided with an insulating sheath 28 to minimize the drop in temperature between the metering chamber 11 and the brewing chamber 17.

OPERATION - FIG. 4

This figure illustrates the operating circuits for the apparatus of FIG. 1. Certain structural elements shown only in this figure are described below in connection with the description of these circuits and their operation.

The principal elements which appear only in FIG. 4 are a motor 85 which drives the air compressor 75, a timing motor 86 which drives three cams 86a, 86b and 86c, and a valve operating motor 87. Current is supplied to the circuit of FIG. 4 from AC input terminals 90, from which it flows through a circuit breaker 91 operated by a limit thermostat 92 associated with the main heater 82. The current then flows through a double pole master switch 93, which may be manually closed to energize the apparatus.

The operation of the circuit under steady state conditions will first be described. That is to say, it is assumed that the reservoir 13 is filled with water and that the heating chamber 10 and the metering chamber 11 are also filled to the level illustrated in FIG. 1. The procedure for getting these chambers filled under initial start-up conditions will subsequently be described more completely.

With the reservoir 13, the heating chamber 10 and the metering chamber 11 full, closure of the main switch 93, completes an obvious energizing circuit for the main heater 82 through the right-hand contact 84c of the temperature regulating thermostat. It also completes a circuit for an ON lamp 94, and a circuit for the warming heater 4 through the thermostat 5. No further operation of the apparatus can take place until the water in the heating chamber reaches brewing temperature, whereupon the movable contact 84a of the temperature regulating thermostat 84 moves from right-hand contact 84c to left-hand contact 84b. The water in metering chamber 11 will also be at or near the brewing temperature at this time. Engagement of the moving contact 84a of the thermostat with its left-hand stationary contact 84b completes an obvious circuit for a READY light 95, indicating to the operator that the apparatus is ready to start brewing coffee. The operator may then press a start switch 96, which initiates a brewing cycle. A circuit may then be traced from the lower power supply line 97 through switch contacts 84a, 84b, wire 100, switch 96, wire 101, motor 86 and wire 102 to the upper supply line 103. A brewing signal lamp 104 is connected across the motor 86 and is lighted at the same time that the motor 86 is started. Note that until switch finger 84a engages contact 84b, operation of switch 96 is ineffective.

Motor 86 drives three cams 86a, 86b and 86c, which operate switches 105, 106 and 107 respectively. Switch 105 is closed by cam 86a as soon as the motor starts and completes a holding circuit for motor 86 which may be traced from wire 97 through wires 110 and 111, switch 105, motor 86, and wire 102 to the other supply line 103. The cam 86a and switch 105 ensure that the motor 86, once started, completes a full cycle of one revolution of the cams before it is de-energized, regardless of any change which may take place in the position of thermostat switch contact 84a, or start switch 96.

Switch 106 controls a circuit for supplying energy to the motor 85 which drives air compressor 75. The circuit may be traced from supply line 97 through wires 110 and 111, switch 106, motor 85 and wire 112 to the other supply line 103. This switch is not closed when the motor 86 first starts, but remains in its off position for approximately 10 seconds, and then closes. The compressor 75 continues running for a time which may be adjusted by setting the split cam 86b, from about 3 to about 5 minutes.

Switch 107 closes a starting circuit for valve operating motor 87 which drives the shaft 53 carrying the cam 52. That cam rotates clockwise, as shown in the drawing, and engages the pin 51 and drives the slide 50 downward. This closes the valve 57 at the inlet to the metering chamber 11 and opens the valve 31 at the inlet to the heating chamber 10. The plate 50 carries a cam 113 which operates a switch 114. As soon as the plate 50 starts downwardly, switch 114 is closed, in parallel with the switch 107. Thus, a holding circuit may be traced from wire 110 through switch 114 to motor 87. The motor 87 is thereby kept operating until the plate 50 reaches its lowest position, where the valve 31 is open and the valve 57 is closed. The cam 113 then opens the switch 114, thereby de-energizing motor 87, since by this time the cam 86c has reopened the switch 107. Plate 50 is held in place in this position by engagement of cam 52 with pin 51. This condition continues until switch 107 is closed again for a brief interval at the end of the timing cycle.

The pressure regulating mechanism 64, which includes the weight 71, is no longer supported by the spring finger 46b, but is supported by the seat 65 resting on the knife edge 56c.

Air pumped into the metering chamber 11 by the compressor 75 can flow out only through the orifice defined by conical tip 74a and the opening in disc 66. The air flow from the compressor builds up the pressure in the metering chamber 11 until the rate of air flow through the orifice balances the flow from the compressor. This pressure in the metering chamber is necessarily positive, i.e., somewhat greater than atmospheric, and is sufficiently greater to force the water in the metering chamber through the outlet conduit 26.

After the valve 57 is closed, cam 86b closes switch 106 to start the compressor 75 which now delivers air under pressure to the top of the metering chamber 11. That pressure is under the control of the pressure regulator 64. The air under pressure in the metering chamber 11 drives the hot water therein out through the conduit 26 and into the brewing chamber 17. The pressure acting on the surface of the water in the metering chamber remains fixed, and the water flow rate remains constant. After the water level in the metering chamber 11 falls below the inlet end of the pipe 26, the flow of water through that pipe ceases and is replaced by a timed flow of air from the compressor. This flow of air purges the pipe 26 and forces any water remaining in the brewing chamber 17 down through the coffee and through the outlet opening 20a into the receptacle 6. The air compressor continues for a period of time long enough to ensure that all of the coffee solution is removed from the ground coffee in the brewing chamber. The compressor may continue running throughout the purging period. Alternatively, it may be turned off before the end of that period, and the compressed air trapped in the metering chamber may then complete the purging operation.

When the motor 86 approaches the end of its timing cycle, cam 86c closes switch 107 momentarily again and thereby starts motor 87 to drive the cam 52 past the pin 51, whereupon the spring 54 returns the slide 50 suddenly to its upper position. This upward movement of the slide closes the inlet valve 31 to the heating chamber and opens the valve 57 at the inlet to the metering chamber. Furthermore, since this motion of slide 50 is rapid under the influence of spring 54, and the upward movement of the valve stem 56 is retarded by the friction at O-ring 62, the spring finger 46b lifts the weight 71, separating seat 65 from knife edge 56c, and providing a larger outlet for the air in the chamber 11, which now flows around the knife edge 56c and out through the vents 67d and vent 12a to the atmosphere. This allows the metering chamber 11 to refill rapidly with hot water. Thus, the water in the chamber 11 is exposed to the air during each cycle to provide aeration of the brew water.

Flexible tube 72 provides a vent from heating chamber 10 to the atmosphere. Air flowing through this vent and the air flowing through the vents of pressure regulator 64 tend to be heavily laden with water vapor, so that there may be condensation in the flange 67b and on the parts 12, 12a and 12b of the cover. The V-shaped flange 67b collects any such condensation. Whenever the heating chamber 10 is connected to the metering chamber 11, the water level in the chamber 10 is lowered, and air is drawn in through the tube 72, effectively draining the V-shaped flange and returning the condensation to the heating chamber 10.

The flexible tube 72 connected to the flange 67b is placed under endwise compression when the valve 57 is closed. In order to relieve this compression, the coupling 72 flexes, rotating the pressure regulator assembly 64 as the valve moves downwardly. This rotation movement produces a wiping action between the knife edge 56c and the seat 65, thereby cleaning those parts and preventing any accumulation of foreign materials which might otherwise adversely affect the regulation of the air pressure. This rotational movement also assures a positive seal every cycle.

During initial start-up procedure, when the heating chamber 10 and the metering chamber 11 are both empty, the push rod 40 is manually operated to open the valve mechanism 27 to fill the two chambers. Thereafter, the master switch 93 may be closed to turn on the main heater. It may happen that since the heater 82 is not then in as good heat-conducting relation with the water in the metering chamber as it is with the water in the heating chamber, that the first batch of coffee produced by the apparatus will be infused at a temperature a few degrees below the optimum for which the thermostat is set. This condition will not exist for subsequent batches.

The push rod 40 may be manually operated at any other time that it is observed that the water level in the heating chamber 10, as viewed through slot 38, is lower than the standard level established for the beginning of the brewing cycle. The valve mechanism 27 may thus be held open until water from reservoir 13 has restored the standard level.

The heater 82 is designed to be capable of heating water from its nominal inlet temperature to the desired brewing temperature at a rate substantially equal to the rate of flow of water through the inlet valve 31. If the heating rate is so designed, and the rate of flow of water under the gravity head through the inlet is so controlled, then after the inlet valve 31 closes, the water in the heating chamber 10 is substantially at or near its brewing temperature, so that there is little delay between brewing batches.

FIG. 5

This figure shows an automatic control for the water supply and for the level in the heating chamber 10 from a direct plumbing connection through the reservoir. Water is supplied to the reservoir through a pipe 120 connected to a conventional water supply. The water in pipe 120 flows through a valve 121 operated by a solenoid 122, and thence through a constant flow rate valve 123, which may be of the type shown in the patent to Kempton U.S. Pat. No. 2,454,929. The circuit for solenoid 122 extends from the AC supply 90, through a switch 124 operated by a cam 86d driven by the motor 86. A water level responsive control 125, which may be either a float or any other suitable type, is mounted in the heating chamber 10 and is connected in series with the solenoid 122. The water level control 125 prevents overfilling of the heating chamber 10. The switch 124 is closed by the cam 86d so as to hold valve 121 open for substantially the same amount of time that plate 50 is in the down position.

FIGS. 7-8

These figures illustrate modifications of the apparatus which are adjustable to deliver substantially different quantities of coffee and to adjust the strength of the coffee. The embodiment illustrated in FIGS. 1 to 3 is particularly intended for commercial establishments where each batch of coffee is made at maximum capacity. The embodiments of FIGS. 7 and 8 are intended for domestic coffee makers, where the number of cups in a batch may be varied in accordance with the number of people to be served.

FIG. 7 shows a set of three conduits 26, 132, 133 of different lengths. The upper end of the conduit 26 is provided with a right angle bend and is shown in FIG. 6 connected to a flexible conduit 136 which is functionally a continuation of the conduit 26. That is to say, it leads to the top of the brewing chamber 17. The conduit 26 is long enough to cause the coffee maker of FIGS. 1 to 3 to discharge its maximum capacity, as determined by the difference in level between the surface 137 of the water in the metering chamber 11 and the level of the inlet end 26a of conduit 26. If it is desired to change the capacity of the coffee maker from, for example, ten cups to six cups or two cups, then the nut 126 is loosened on the projection 11a. The conduit 26 can be lifted out and replaced with one of the conduits 132 or 133, depending upon the capacity desired. When the nut 126 is tightened, it squeezes the O-ring 141 and thereby frictionally holds the selected conduit 26, or 132 or 133 in a selected vertical position. A fine calibration scale marking on the conduits 26, 132 and 133 assists in making the adjustment for strength.

FIG. 8 shows a modified form of changeable conduit 142. The upper end of the conduit 142 has an expanded head 142a provided with lateral openings 142b and a central opening at its upper end in a rolled inwardly projecting flange 142c.

A screw 143 is provided at its lower end with an integral rod 143a which carries two vertically spaced flanges 143b at its lower end. The inwardly projecting flange 142c is received loosely between the flanges 143b on the screw 143. The screw 143 is threaded through a bushing 144, which is in turn threaded into a tubular projection 145 extending upwardly from the metering chamber 11. An O-ring 146 provides a seal between a shoulder on the boss 145 and the bushing 144. The boss 145 is provided with a laterally projecting inlet 147, which may be connected to a flexible conduit such as that shown at 136 in FIG. 6.

Another O-ring 148 provides a seal between the expanded head 142a and the boss 145.

As in the case of the conduits 26, 132 and 133 of FIG. 7, a set of conduits 142 of different lengths would be provided. Each conduit 142 would be permanently attached to its screws 143 and bushing 144. The screw 143 may be moved short distances to vary the strength of the brewed coffee by including more or less water in the particular batch. A similar adjustment may be made in the case of the conduits 26, 132 and 133 of FIGS. 6 and 7.

When the quantity to be brewed is changed by changing one of the conduits such as 26 in FIG. 6 or the conduit 142 in FIG. 8, so as to vary substantially the volume of water discharged in a batch, the pressure regulating screw 74 of FIG. 2 should be reset at the same time. Thereby, the pressure maintained on the surface of the metering chamber is balanced with the quantity to be brewed, with the object of maintaining a constant brewing time, regardless of the difference in the quantity. In other words, if the quantity to be brewed is reduced by half, then the pressure in the metering chamber 11 should be reduced so that the rate of delivery of water from the metering chamber is half what it was before. Hence, it will take the same length of time to deliver that smaller quantity of water to the brewing chamber.

I claim:

1. Coffee brewing apparatus comprising:
   a. a water heating chamber;
   b. a water metering chamber;
   c. valve means controlling communication between the heating chamber and the metering chamber;
   d. means, including said valve means, operable to fill the metering chamber to a predetermined level with heated water;
   e. a coffee brewing chamber;
   f. a conduit having an open entrance end in the metering chamber and extending above the upper end thereof to a discharge end in the brewing chamber;
   g. means for adjusting the vertical position of said open entrance end; and
   h. means operable to close the valve means and thereafter to supply air under pressure to the metering chamber above the surface of the water therein to discharge water through the conduit into the brewing chamber and to terminate that discharge after the level drops below said open end, so as to discharge into the brewing chamber a quantity of heated water determined by the adjusted position of the open entrance end of the conduit.

2. Coffee brewing apparatus as in claim 1, in which said adjusting means includes stepped means operable to move said open conduit end in increments, each operatively equal to a whole number of cups of coffee.

3. Coffee brewing apparatus as in claim 1, in which said adjusting means includes fine control means shiftable to move said open conduit end selectively to any position within a limited range to vary the strength of the coffee.

4. Coffee brewing apparatus including:
   a. a water metering chamber for retaining a predetermined volume of heater water;
   b. an infusion chamber for receiving coffee to be infused;
   c. a conduit leading from an open entrance at a predetermined level in the metering chamber to the infusion chamber;
   d. means for supplying air under a substantially constant pressure to the metering chamber, said air pressure supply means being effective to discharge a predetermined volume of water through said conduit at a predetermined continuous flow rate; and
   e. time controlled means for maintaining the supply of air under pressure for a predetermined time after the water level drops below said conduit entrance, said predetermined time being long enough to force air through the coffee grounds in said infusion chamber.

5. Coffee brewing apparatus comprising:
   a. an infusion chamber for receiving coffee to be infused;
   b. a metering chamber;

c. a heating chamber encircling and enclosing said metering chamber, said heating chamber having a bottom with a channel-shaped peripheral well therein;
d. a heater in said well;
e. temperature sensing means in said heating chamber;
f. means including said temperature sensing means for controlling the supply of energy to the heater;
g. means for discharging heated water from the heating chamber to the metering chamber; and
h. means for discharging water from the metering chamber to the infusion chamber.

6. Coffee brewing apparatus as in claim 5, in which:
a. said well has its bottom slanted from an uppermost point to a lowermost point; and
b. drain means at the lowermost point of the well.

7. Coffee brewing apparatus comprising:
a. an infusion chamber for receiving coffee to be infused;
b. a metering chamber;
c. a heating chamber encircling and enclosing said metering chamber;
d. a heater in said heating chamber;
e. temperature sensing means in said heating chamber;
f. inlet means for directing incoming unheated water directly against said temperature sensing means;
g. means including said temperature sensing means for controlling the supply of energy to the heater;
h. means for discharging heated water from the heating chamber to the metering chamber; and
i. means for discharging water from the metering chamber to the infusion chamber.

8. Coffee brewing apparatus including:
a. a metering chamber;
b. a water heating chamber;
c. heating means in the heating chamber having a heating capacity to heat a predetermined volume of water from a normal inlet temperature to brewing temperature in a predetermined time;
d. a reservoir for retaining said predetermined volume of fresh water;
e. reservoir outlet valve means for controlling the flow of water by gravity from the reservoir to the heating chamber, said valve means having a rate of gravity flow to discharge said volume of water in said predetermined time;
f. time controlled means for opening said outlet valve means and holding it open for said predetermined time, so that when the valve means is closed by the time controlled means, the water in the heating chamber is heated substantially to the brewing temperature;
g. an infusion chamber for receiving coffee to be infused;
h. means for discharging heated water from the heating chamber to the metering chamber; and
i. means for discharging water from the metering chamber to the infusion chamber.

9. Coffee brewing apparatus as in claim 8, including bypass valve means operable to increase the rate of flow between the reservoir and the heating chamber to reduce the start-up time of an initial brewing cycle.

10. Coffee brewing apparatus as in claim 9, including manually operable means for opening said bypass valve means.

11. Coffee brewing apparatus including:
a. a water metering chamber for retaining a predetermined volume of heated water;
b. an infusion chamber for receiving coffee to be infused;
c. a conduit leading from an open entrance at a predetermined level in the metering chamber to the infusion chamber;
d. air compressor means for supplying a substantially constant volumetric flow of air to the top of the metering chamber;
e. variable bleed means at the top of the metering chamber for regulating the pressure therein, said air compressor means and said variable bleed means being effective to discharge said predetermined volume of water through said conduit at a regulated flow rate.

12. Coffee brewing apparatus as in claim 11, including pressure relief means for said metering chamber, said pressure relief means comprising a vent communicating with the top of said chamber, and valve means for closing the vent and biased toward a vent closed position.

13. Coffee brewing apparatus as in claim 11, including:
a. collector means adjacent the outlet of said variable bleed means for collecting moisture condensed from air being discharged from the metering chamber;
b. drainage means connecting said collector means to the metering chamber.

14. Coffee brewing means as in claim 11, including:
a. an inlet valve at the bottom of the metering chamber;
b. a hollow valve stem extending upwardly from said valve;
c. means biasing said valve and stem to a valve open position;
d. means for closing said valve against said biasing means;
e. said stem being closed at the bottom, open at the top and having at least one lateral vent at an intermediate point;
f. a seat member engageable with the top of the stem;
g. orifice means in said seat member, said orifice means being variable to vent air through said stem at a selectable rate;
h. means biasing the seat toward engagement with the end of the stem;
i. means to lift the seat for quick opening action; and
j. vent passage means connected in parallel with said orifice means when the seat is lifted.

15. Coffee brewing apparatus as in claim 14, including a basin carried on said seat member and encircling said orifice means to collect water condensing from air discharged through said orifice means.

16. Coffee brewing apparatus as in claim 15, including a flexible conduit extending from said basin to the top of said heating chamber, said conduit being compressed during movement of said seat member toward the heating chamber and thereby effective to rotate the seat member on the top of the stem, so that a wiping engagement of the seat member and the stem is secured.

* * * * *